United States Patent [19]

Desbos et al.

[11] Patent Number: 4,504,388
[45] Date of Patent: Mar. 12, 1985

[54] REACTOR FOR INJECTION OF GAS INTO A LIQUID

[75] Inventors: Gilbert Desbos, Paris; Michel Faivre, Chelles, both of France

[73] Assignee: OTV (Omnium de Traitement et de Valorisation), Courbevoie, France

[21] Appl. No.: 503,902

[22] Filed: Jun. 13, 1983

[30] Foreign Application Priority Data

Jun. 14, 1982 [FR] France .............................. 82 10290

[51] Int. Cl.³ .............................................. E02C 1/12
[52] U.S. Cl. .................................. 210/150; 210/221.2; 261/77; 261/123
[58] Field of Search ............... 210/150, 275, 279, 293, 210/217, 618, 220, 221.1, 221.2; 261/77, 123

[56] References Cited

U.S. PATENT DOCUMENTS

| 273,539 | 3/1883 | Hyatt | 210/293 |
|---|---|---|---|
| 2,412,032 | 12/1946 | Bill, Jr. | 210/293 |
| 2,618,356 | 11/1952 | Matheis | 210/153 |
| 2,669,440 | 2/1954 | Lindenberg | 210/221.2 |
| 3,307,701 | 3/1967 | Krofta | 210/221.2 |
| 4,198,359 | 4/1980 | Todd | 261/123 |
| 4,338,202 | 7/1982 | Louboutin | 210/293 |
| 4,435,286 | 3/1984 | Louboutin et al. | 210/275 |

FOREIGN PATENT DOCUMENTS 1461416  3/1969  Fed. Rep. of Germany ...... 210/293

Primary Examiner—John Adee
Attorney, Agent, or Firm—Browdy and Neimark

[57] ABSTRACT

Reactor having considerable volume or surface for injection and distribution of a gaseous fluid into a liquid mass to be treated, includes a false bottom having over its entire surface a series of nozzles each having a small orifice, incorporated with a pipe, immersed in the liquid, whose perforated base rests on the false bottom and whose closed upper end is provided with slots from which gas bubbles escape into an active zone of the liquid mass.

8 Claims, 3 Drawing Figures

REACTOR FOR INJECTION OF GAS INTO A LIQUID

FIELD OF INVENTION

This invention relates to introducing and distributing gaseous fluids under relatively slight pressure in a liquid mass within a reactor of considerable volume and surface. It relates more particularly to a system for injection of gas into a liquid mass within a false-bottom reactor wherein the liquid may contain a bed of granular material that is fixed or in suspension.

BACKGROUND

It is known that in techniques intended to assure a mixing or putting different phases in contact, for example, gas-liquid-solid phases, numerous difficulties are encountered, particularly on the hydraulic level and in particular when an effort is made to create several zones of different activities or effects in the liquid mass or liquid-solid mixture.

For example, in treating aqueous media where air injections are made in large-surface filters having granular materials with co-current circulation of the fluids, the phenomena are kept under control by using two well known processes: either the "air cushion" where the air and water penetrate between the false bottom (or support) and floor (or base) of the filter and then are sent into the aqueous medium to be treated, charged with filtering material, by means of a series of pump strainers having calibrated orifices; or "air rackets" in which the air is channeled in branched pipes placed on the surface of the floor to calibrated orifices provided on each branching at right angles to tail-less pump strainers, the air that escapes from the calibrated orifices then going with the wash water into the pump strainers before going into the filtering material.

However, difficulties begin when the air is supposed to be sent uniformly over the entire surface of a granular mass countercurrent to a liquid also going through the filtering mass. Such difficulties become very serious when, in addition, zones of different activities are to be maintained in the bed, which is or is not fluidized, for example in the case of biological filtering where the air for oxidizing the polluted materials of the water must be blown in, in an ascending manner, at an intermediate level of the submerged, fixed bed of granular filtering material (see, for example, French Pat. Nos. 76.21246 and 78.30282).

Actually, for there to be a possibility of air injection, it is necessary that the air pressure be greater than that of the column of water on the air injection points; the air can rise as bubbles in the liquid mass only if the force linked to the speed of the water that is filtering in the opposite direction (descending) is less than the buoyancy exerted under the air bubbles; now, this force increases with the clogging of the filter and the travel of the air quickly becomes preferential in the form of "air pockets" which obviously impair the filtering or purification efficiency. It is possible to send the air through perforated pipes placed above the false bottom of the filter which supports the pump strainers for washing the clogged material with an air and water mixture to inject air in the lower half or active zone of the biological filter. Installing these pipes, superposed on standard filter elements, makes the reactor or filter larger and entails additional installation and maintenance costs.

Both for simplification and in an effort to obtain minimum pressure drops, the applicant undertook a series of studies and tests aimed at improving particularly the pump strainers, for example, by developing "double" pump strainers comprising an internal air injection, separated from the free volume of filtering or washing air-water entrainment; and by working on the number of pump strainers per square meter of filtering surface or the diameters and lengths of the air injection pipes. The results were disappointing; in particular, the height of the air cushion under the false bottom of the filter (or reactor) was excessive and impossible to maintain at a constant rate during increase of the air delivery, because the variation in the pressure drop is proportional to the square of the delivery of gas injection.

SUMMARY OF THE INVENTION

After these unsuccessful attempts, studies were undertaken to assure an effective scattering of the gas bubbles in the liquid mass, with entrainment and circulation of the latter, in a zone located above the false bottom of the reactor, so that the height of the gas cushion under the false bottom, where the gas injection takes place, no longer depends on the variation in gas delivery for a given clogged condition.

It has now been found that these results can be obtained, according to the invention, by providing the false bottom of the reactor on its entire surface with a series of nozzles having orifices with a very small diameter, each of which is incorporated with a pipe, immersed in the liquid mass to be treated, having a perforated base which rests on the false bottom and a closed upper end provided with slots.

In practice, each nozzle, which serves as the point of introduction of gaseous fluid into the reactor, comes out approximately flush with the false bottom (or floor) of the reactor and has a very small diameter, calculated as a function of the delivery and which advantageously can vary between 0.2 and 4 mm. The pipe that extends the nozzle rises a certain height above the false bottom, generally between about 10 and 50 cm, to come out by its upper end in the active zone of the reactor.

Thanks to the perforations provided at the base on the periphery of the pipe, having for example diameters varying between 1 and 5 mm and preferably 2 to 3 mm, each pipe-nozzle unit or "gas nozzle" acts as an hydraulic control: the gas, coming from a main intake pipe in the false bottom of the reactor, goes into the orifice of the nozzles and assures, in each pipe where the liquid penetrates into the pipe through the perforations at the base, a sufficient fluid circulation to constantly break up the homogeneity of the gaseous phase in circulation; the discontinuous, nonhomogeneous gaseous phase is thus guided to the upper end of the pipe and the gas bubbles come out, through the slots in the upper end of the pipe, at the level of the liquid corresponding to the desired active zone. Thus, in the system according to the invention, everything happens from the pressure viewpoint as though the gas diffusion took place directly at the level of the false bottom of the reactor, but with the advantages of a very small air cushion height which makes it possible to reduce the total height of the reactor and thus reduce manufacturing costs.

According to a variant embodiment, the gas nozzle has a Venturi type design and therefore, at the level of the base of the pipe, takes the shape of a double convergent-divergent cone in the narrow portion of which are located the perforations for circulation of the liquid mass of the reactor.

According to a particularly advantageous embodiment in case the invention is used for biological water purification with blowing in of air or oxygen at a certain level of the liquid mass provided with a bed of immersed granular material, the series of said gas nozzles can alternate with series of standard pump strainers placed on the false bottom of the reactor to provide for the draining of the treated effluent; such pump strainers are also used periodicly for the upward passage of air and washing water to insure the regeneration of the biological and/or filtration bed.

BRIEF DESCRIPTION OF DRAWINGS

The invention will be better understood by a more detailed description of non-limiting examples, applied in the precited case of biological purification of water and illustrated by schematic drawings which represent.

DETAILED DESCRIPTION OF EMBODIMENTS

Figure 1:
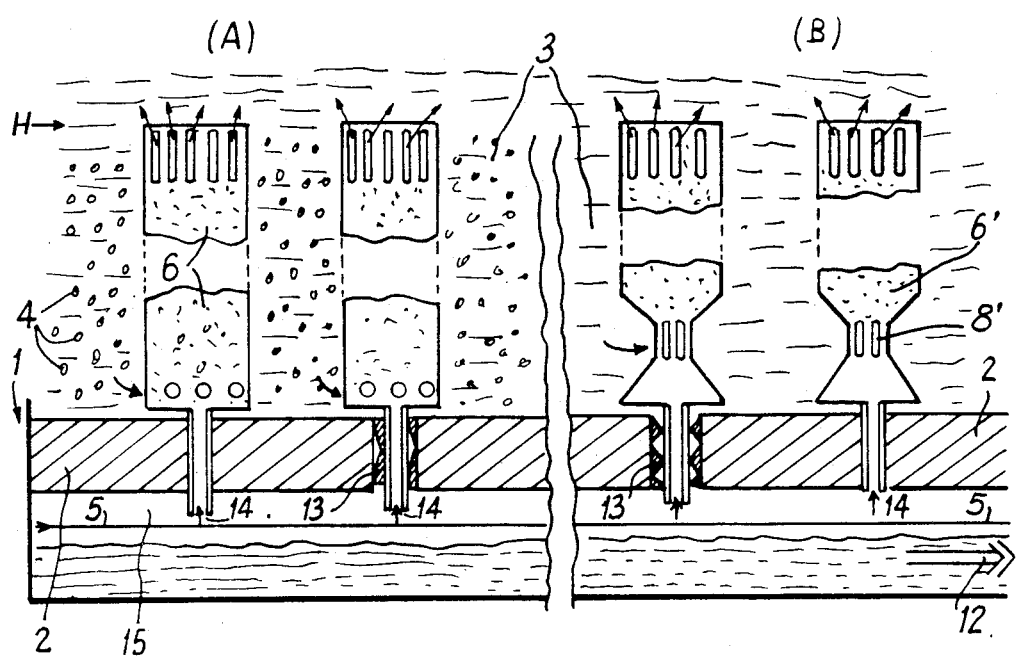
FIG. 1: two examples (A and B) of the injection device for gaseous fluid according to the invention.

The test examples schematized in the figures are based on cases of biological water purification in reactors or filters 1 containing above a false bottom 2 a mixture of a water mass 3 to be treated and a fixed bed of granular material 4. Circulating water descends through the filter bed whereas air or oxygen from a main pipe 5, disposed under the false bottom or floor 2, is injected upwardly. The very specific technical problem to be resolved is to obtain a uniform air (or oxygen) diffusion, not at the base of the bed, but at a certain level H corresponding to a special activation zone.

The solution of this problem, according to the invention, consists of installing at regular intervals on the entire surface of the false bottom 2 series of air nozzles 6 constituted of cylindrical pipe elements 7 having perforations 8 at the base thereof and slits 9 at the upper portion and which are extended by microtubes 10 inserted into the false bottom 2. The opening 14 of the microtubes 10 are of very small diameter, and these microtubes exit practically at the level of this false bottom (see FIG. 1, part A on the left). In practice, the openings 14 can vary in diameter in a general manner between 0.2 and 4 mm and preferably between 0.8 to 1.5 mm. Further, the inside diameter of the cylinder 7 can be on the order of 20 to 30 mm, with variable height, for example between 10 and 50 cms for the above identified usage. Regarding the diameter of the perforations 8, these are generally in the order of 2 to 3 mm diameter approximately. One can therefore arrange between 40 and 120 air nozzles according to the invention per square meter of false bottom of the reactor.

According to the variant shown in the right part (B) of FIG. 1, the gas nozzles can have the shape of Venturi tubes 6', in which case perforations 8' are then provided in the common part of the two convergent-divergent cones.

Figure 2:
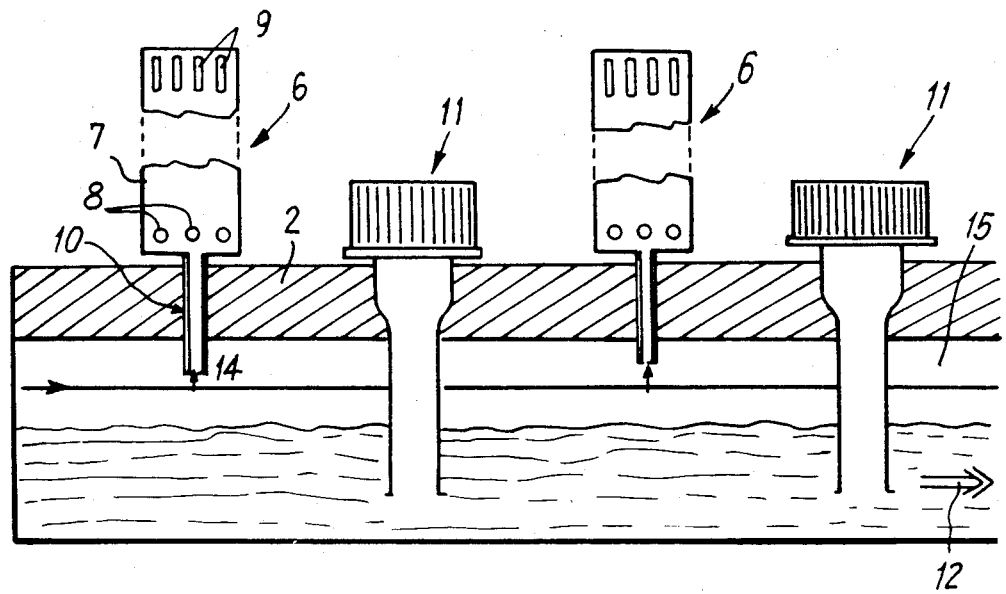
FIG. 2: another variant of device according to the invention.

In the embodiment of FIG. 2, there are alternately installed in false bottom 2 of the reactor, on the one hand, gas nozzles of type 6 or 6' and, on the other hand, pump strainers 11 of well known construction which are used particularly to drain the treated liquid (here purified water) at the base of the reactor, with evacuation at 12. The pump strainers 11 are also used for blowing in at the bottom of air and washing liquid when the granular bed located above the false bottom 2 is to be regenerated. It will be noted that in the case where these pump strainers 11 do not exist (FIG. 1), evacuation of the treated liquid is performed at the base of the liquid mass, just above the false bottom.

Insertion of the gas nozzles 6 or 6' and possibly pump strainers 11 in the false bottom 2 can be effected by seals 13 when the false bottom is made of concrete or fibrocement. However, it can be advantageous to provide a false bottom of molded plastic, for example polyvinyl chloride or the like to fit the microtubes 10 of the gas nozzles 6, 6' and the lower pipes of the strainers 11 directly by force, without a seal.

In operation, the gas slightly compressed, for example air, which goes into the small orifices 14 of the gas nozzles, entrains by its speed in guide pipe 7 an intake of water 3 through perforations 9; this water, on mixing with the injection gas, breaks up the homogeneity of the gas stream that is changed, in pipe 7 and particularly at its output through slots 9, into a string of bubbles which serve to activate zone H of the reactor.

Various tests established that the useful air cushion 15 located below false bottom 2 also remains very modest because use of the system according to the invention entails very slight pressure drops. For example, this useful cushion was about 29 cm for an air delivery rate of 220 liters/hour per nozzle (corresponding for 90 nozzles/m$^2$ of false bottom to 20 m$^3$/m$^2$/h of air) with air intake orifices 14 having a diameter of 1.1 mm and with the other following characteristics:

inside diameter of pipe 7: 20 mm; perforations 8 of 2.5 mm in diameter; length of pipe above the false bottom: 0.25 mm; water head above the false bottom: 2.45 m.

Figure 3:
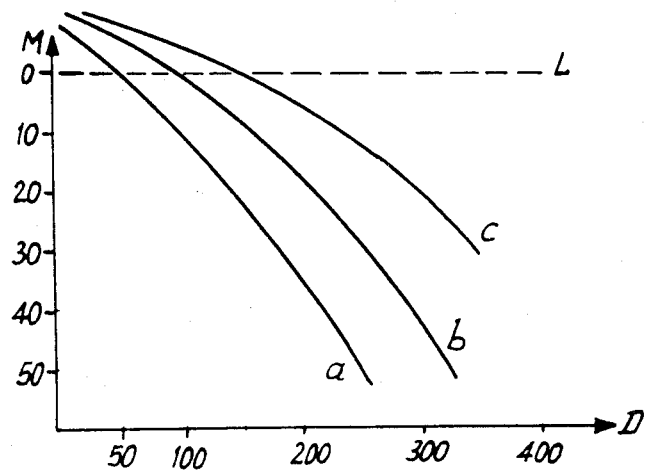
FIG. 3: curves illustrating the heights of the air cushion under the added injection, due to the injected air delivery in the gas nozzles, according to an example of usage.

The graph of FIG. 3 shows some variations of the height of the air cushion (y-axis M expressed in centimeters in relation to the broken line L representing the level of the false bottom) in relation to air delivery D plotted on the x-axis and expressed in liters per hour and per nozzle. Curves a, b and c correspond respectively to the diameters of the orifices 14 respectively of 1, 1.2 and 1.3 mm and they are indicated, of course, by way of illustration.

The foregoing description of the specific embodiments will solely reveal the general nature of the invention that others can by applying current knowledge, ratherly modify and/or adapt for various applications such specific embodiments without departing from the generic concept, and, therefore, such adaptations and modifications should and are intended to be comprehended within the meaning and range of equivalents of the disclosed embodiments. It is to be understood that the phrasiology of terminology employed herein is for the purpose of description and not of limitation.

What is claimed is:

1. An apparatus for the injection of gaseous fluids into a liquid mass, comprising:
   a reactor means for containing a liquid, said reactor means having a bottom wall;
   a plurality of nozzles disposed on the bottom wall of said reactor means, each said nozzle comprising
   a pipe portion extending from a level substantially even with the level of said bottom wall to a height a predetermined distance above said bottom wall, the top of said pipe portion being closed;

a tube portion connected to the bottom of said pipe portion and extending through the bottom wall of said reactor, the diameter of said tube portion being substantially smaller than the diameter of said pipe portion at the bottom thereof, the bottom of said pipe portion being closed except for said tube portion;

wherein said pipe portion includes a plurality of perforations near the bottom thereof, whereby gaseous fluid passing through said tube portion into said pipe portion causes liquid in said reactor means to be sucked through said perforations, thereby breaking up the homogeneity of said gaseous fluid and wherein said pipe portion further includes a plurality of slots near the top thereof, whereby liquid and gas bubbles pass through said slots at the predetermined desired height of gaseous fluid introduction; and gaseous fluid introduction means for supplying gaseous fluid to the lower end of said tube portions.

2. An apparatus of accordance with claim 1, wherein said pipe portion is shaped with convergent and divergent conical portions to form a Venturi section therein and wherein said plurality of perforations are disposed within the narrow portion of said Venturi section.

3. An apparatus in accordance with claim 1 for the biological purification of waste water and further including a fixed bed of granular material within said reactor means and resting on the bottom thereof surrounding said nozzles.

4. An apparatus in accordance with claim 1 and further including a plurality of pump strainer means for passage therethrough of the treated liquid in the bottom of said reactor means interspersed among said nozzles.

5. An apparatus in accordance with claim 1, wherein each said tube portion has an inner diameter of 0.2 to 4 mm.

6. An apparatus in accordance with claim 1, wherein the height of said pipe portion above the bottom wall of said reactor means is between 10 and 50 cm and the perforations provided at the bottom wall of each said pipe portion have diameters from 1 to 5 mm.

7. An apparatus in accordance with claim 5, wherein the height of the pipe portion above the bottom wall is between 10 and 50 cm and the perforations provided at the bottom wall of said pipe portion have diameters from 1 to 5 mm.

8. An apparatus in accordance with claim 2, wherein each said tube portion has an inner diameter of 0.2 to 4 mm.

* * * * *